United States Patent [19]

Greig

[11] 4,089,469

[45] May 16, 1978

[54] GARDEN WATERING DEVICE

[76] Inventor: David R. Greig, 927 Noio St., Honolulu, Hi. 96816

[21] Appl. No.: 721,324

[22] Filed: Sep. 7, 1976

[51] Int. Cl.² ............................................. B05B 15/06
[52] U.S. Cl. .................................... 239/287; 239/530; 248/76
[58] Field of Search ............... 239/273, 286, 287, 280, 239/530, 525, 195; 222/173, 174; 248/76, 75, 80, 87

[56] References Cited

U.S. PATENT DOCUMENTS

| 858,883 | 7/1907 | Lindsay | 248/80 |
| 1,949,904 | 3/1934 | Guedel | 239/287 X |
| 2,446,723 | 8/1948 | Schaechterle | 248/81 |
| 2,455,037 | 11/1948 | Bremer | 248/87 |
| 2,769,999 | 11/1956 | Sheahan | 248/76 UX |
| 3,012,731 | 12/1961 | Williams | 239/525 X |

Primary Examiner—John J. Love
Attorney, Agent, or Firm—Clarence A. O'Brien; Harvey B. Jacobson

[57] ABSTRACT

A garden watering device having a longitudinally extending member provided with spaced means for mounting a hose so that an outlet of the hose is at the lower end of the member when the member is disposed substantially vertically. A handle is connected to the member adjacent the upper end of the member when same is disposed vertically for facilitating manipulation of the member so as to cause the hose to traverse a predetermined area to be watered.

4 Claims, 3 Drawing Figures

GARDEN WATERING DEVICE

BACKGROUND OF THE INVENTION

1. Field of the Invention

This invention relates generally to a watering device, and particularly to a device for holding a garden hose in such a manner as to direct the water flow from the hose at ground level without necessitating one manipulating the hose to bend and stoop.

2. Description of the Prior Art

When watering shrubbery, and the like, on a large scale, it is generally necessary for a gardener to bend and stoop in order to properly direct the water. Not only is it desirable to direct the water flow from the hose at substantially ground level, but random movements of the hose so as to misdirect the water are to be avoided as well.

Various devices have been proposed for permitting a gardener and the like to hold the outlet of a hose adjacent ground level without the necessity of the gardener to bend over or stoop. One of these proposals provides for a stiff nozzle which can be held by the operator at one end so as to have its outlet adjacent the ground. Such an arrangement, however, does not necessarily provide one with the amount of control over the water flow that is considered desirable.

Examples of prior art devices for permitting water to be discharged at substantially ground level without the necessity of bending or stooping can be found in U.S. Pat. Nos. 858,883, issued July 2, 1907; U.S. Pat. No. 1,809,550, issued June 9, 1931; 2,455,037, issued Nov. 30, 1948; 2,607,622, issued Aug. 19, 1952; and U.S. Pat. No. 2,655,408, issued Oct. 13, 1953.

SUMMARY OF THE INVENTION

It is an object of the present invention to provide a garden watering device which provides for the degree of control over the discharge outlet of a hose as is considered desirable for watering shrubbery, and the like.

It is another object of the present invention to provide a garden watering device which is simple of construction and can be used with conventional garden hoses.

These and other objects are achieved according to the present invention by providing a garden watering device having: a longitudinally extending member provided with spaced attachment devices for mounting a hose on the member, and also having a manipulating arrangement for facilitating handling of the member.

The attachment arrangement advantageously includes a plurality of clamps mounted in spaced relation along the longitudinal extent of the member. More specifically, the clamps are three in number and are disposed adjacent to ends of the longitudinally extending member and midway between the ends of the member. The arrangement causes the hose to assume a substantially S-shape when supported by the clamps, with the outlet of the hose being at the lower end of the longitudinally extending member when same is disposed in a substantially vertical orientation.

The manipulating arrangement preferably includes a handle mounted on the longitudinally extending member adjacent the upper end of the member when the member is disposed substantially vertically, a portion of the hose being clamped to the handle in order to rigidify the structure.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
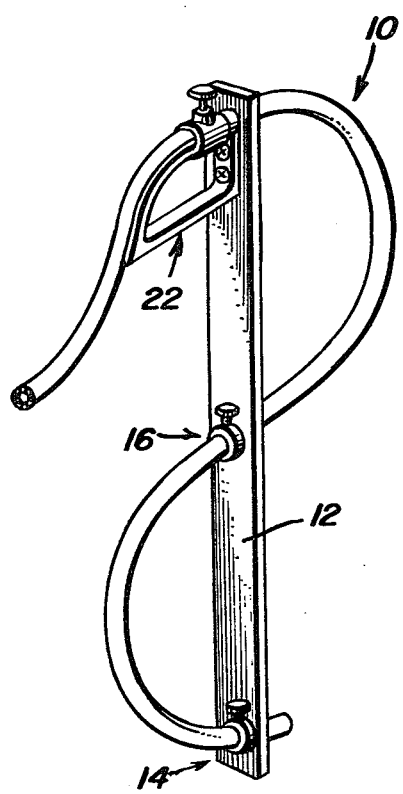
FIG. 1 is a fragmentary, perspective view showing a garden watering device according to the present invention.

Referring now more particularly to the figures of the drawing, a garden watering device 10 according to the invention comprises a longitudinally extending member 12 provided with three equally spaced clamping arrangements 14, 16, and 18 for mounting a hose 20 on member 12. The latter is also provided with a handle 22 attached thereto for facilitating manipulation of member 12. This handle 22 is attached to member 12 at an end of the member 12 which is normally uppermost when member 12 is disposed in a substantially vertical orientation.

Figure 2:
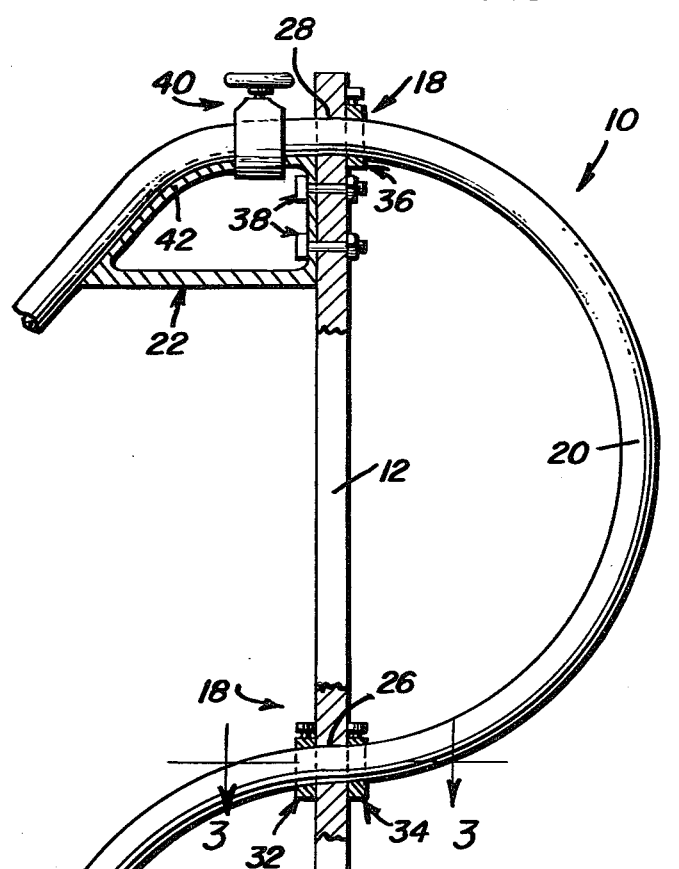
FIG. 2 is a fragmentary, enlarged, side elevational view, partly broken away and in section, showing the garden watering device of FIG. 1.
Figure 3:
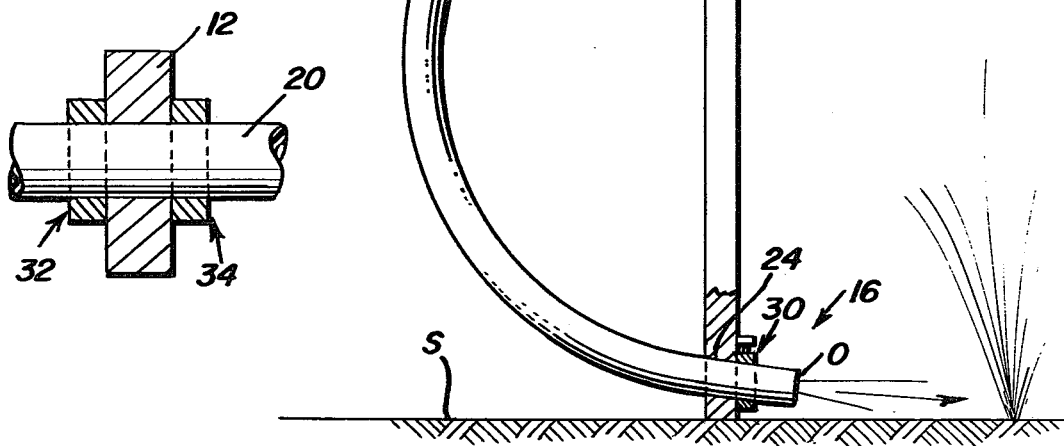
FIG. 3 is a fragmentary, enlarged, sectional view taken generally along the line 3—3 of FIG. 2.

The clamping arrangements 14, 16, and 18 are disposed along member 12 with the arrangements 14 and 18 at respectively the lower and upper ends of member 12 when same is disposed substantially vertically, and arrangement 16 being substantially midway between the arrangements 14 and 18. Each of the clamping arrangements 14, 16, and 18 is associated with a respective hole 24, 26, and 28 provided in member 12. More specifically, clamps 30, 32, 34, and 36 are associated with the arrangements 14, 16, and 18, with clamp 30 forming part of arrangment 14 in conjunction with hole 24, while clamps 32 and 34 cooperate with hole 26 to form clamping arrangement 16 and clamp 36 forms part of clamping arrangement 18 in conjunction with hole 28. By running hose 20 through hole 28, down and around and through hole 26, and once again down and around and through hole 24, the section of hose 20 which extends a few feet back from the outlet of the hose, which is designated by the letter O in FIG. 2, will asume an S-shape when supported by the clamps 30, 32, 34, and 36.

The aforementioned clamps 30, 32, 34, and 36 are advantageously in the form of collars provided with setscrews which will clamp the collar on hose 20 at a particular point desired in order to hold hose 20 in the illustrated S-shape with respect to member 12.

Handle 22 is advantageously secured to the upper vertical end of member 12 as by the illustrated bolts and nuts 38. A collar and screw clamp 40 is also provided to secure handle 22 to the hose 20, which hose 20 is guided along the upper generally arcuate surface of handle 22 by provision in the upper surface of handle 22 of a trough 42 having a generally concave cross section.

As can be appreciated from the above description from the drawing, a garden watering device according to the invention provides a simple yet rugged and easily manageable arrangement for presenting the outlet of a garden hose at a desired point adjacent ground level.

The lower end of the vertically disposed member 12 is either moved across the surface of the ground immediately adjacent to such surface or is actually placed abutting the surface S of the ground when the device is held stationary. An operator (not shown) of the watering device merely grasps handle 22 so as to simultaneously grip the hose 20 and can accurately direct the outlet O of hose 20 without the necessity of bending over or stooping.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A garden watering device, comprising a longitudinally extending member provided with spaced attachment means for mounting a hose on the member, and with manipulating means for facilitating handling of the member, with the attachment means mounting the hose such that an outlet of the hose is disposed at a lower end of the longitudinal member when same is oriented substantially vertically, and with the manipulating means being provided at the upper end of the member when same is oriented substantially vertically, the attachment means including a plurality of clamping means mounted in spaced relation along the longitudinal extent of the member for supporting the hose, there being three clamping means mounted on the member and each including a clamp and a hole provided through the member transverse to the longitudinal extent of the member for receiving the hose, with the clamp of each clamp means comprising a collar registering with the associated hole and arranged for receiving the hose, and a set screw in the collar for retainingly engaging the hose, two of the clamping means being disposed adjacent the upper and lower ends, respectively, of the member and the third clamping means being disposed substantially midway along the longitudinal extent of the member, the hose assuming an S-shape when supported by the clamping means.

2. A device as defined in claim 1, wherein the manipulating means includes a handle mounted on the member adjacent the upper end of the member when same is oriented substantially vertically.

3. In combination with a garden hose including an outlet opening, a garden watering holder for the hose, the holder comprising a longitudinally extending member provided with spaced attachment means for mounting the hose on the member, and with manipulating means for facilitating handling of the member, the attachment means mounting the hose such that the outlet opening of the hose is disposed at a lower end of the longitudinal member when same is disposed substantially vertically, with the manipulating means being mounted at an upper end of the longitudinal member when same is disposed substantially vertically, the attachment means including a plurality of clamps mounted in spaced relation along the longitudinal extent of the member, there being three clamps mounted on the member, two of the clamps disposed adjacent ends of the member and the third clamp disposed substantially midway along the longitudinal extent of the member, the hose assuming an S-shape when supported by the clamps.

4. A device as defined in claim 3, wherein the manipulating means includes a handle mounted on the member adjacent the upper end of the member when same is oriented substantially vertically.

* * * * *